US010780809B2

(12) United States Patent
Jeong

(10) Patent No.: US 10,780,809 B2
(45) Date of Patent: Sep. 22, 2020

(54) HEADREST MOVING DEVICE AND DRIVING UNIT OF HEADREST

(71) Applicant: WOOBO TECH CO., LTD., Pyeongtaek-si, Gyeonggi-do (KR)

(72) Inventor: Hae Il Jeong, Incheon (KR)

(73) Assignee: Woobo Tech Co., Ltd., Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 16/336,200

(22) PCT Filed: Sep. 27, 2017

(86) PCT No.: PCT/KR2017/010654
§ 371 (c)(1),
(2) Date: Mar. 25, 2019

(87) PCT Pub. No.: WO2018/070702
PCT Pub. Date: Apr. 19, 2018

(65) Prior Publication Data
US 2019/0241107 A1  Aug. 8, 2019

(30) Foreign Application Priority Data
Oct. 14, 2016 (KR) .................... 10-2016-0133546

(51) Int. Cl.
*B60N 2/865* (2018.01)
*F16H 25/20* (2006.01)
*B60N 2/806* (2018.01)

(52) U.S. Cl.
CPC ............ *B60N 2/865* (2018.02); *B60N 2/806* (2018.02); *F16H 25/20* (2013.01); *F16H 2025/209* (2013.01)

(58) Field of Classification Search
CPC ................................ B60N 2/865; B60N 2/806
USPC ........................................................ 297/391
See application file for complete search history.

(56) References Cited

U.S. PATENT DOCUMENTS

| 4,762,367 | A | * | 8/1988 | Denton | .................. | B60N 2/865 |
| | | | | | | 297/409 |
| 2013/0229042 | A1 | * | 9/2013 | Kotz | ..................... | B60N 2/888 |
| | | | | | | 297/391 |
| 2013/0341987 | A1 | * | 12/2013 | Humer | .................. | B60N 2/859 |
| | | | | | | 297/391 |

(Continued)

FOREIGN PATENT DOCUMENTS

CN  102387938 A  3/2012
EP  1705057 B1  10/2008

(Continued)

OTHER PUBLICATIONS

Korean Intellectual Property Office International Search Report and Written Opinion of the International Searching Authority, Application No. PCT/KR2017/010654, dated Feb. 1, 2018, 9 pages.

(Continued)

*Primary Examiner* — Anthony D Barfield
(74) *Attorney, Agent, or Firm* — Sunstein LLP

(57) ABSTRACT

The present invention relates to a headrest moving device, more particularly, relates to a headrest moving device provided with a contact assisting member for closely contacting two members engaged with each other for moving the headrest so that power can be smoothly transmitted, the noise can be reduced during the movement on the headrest.

9 Claims, 6 Drawing Sheets

(56) References Cited

U.S. PATENT DOCUMENTS

2015/0183347 A1* 7/2015 Falster .................. B60N 2/821
297/391 X

FOREIGN PATENT DOCUMENTS

| JP | 2007247734 A | 9/2007 |
|----|--------------|--------|
| JP | 2014-097548 A | 7/2015 |
| KR | 10-2006-0134430 A | 12/2006 |
| KR | 100699053 B1 | 3/2007 |
| KR | 10-0833319 B1 | 5/2008 |

OTHER PUBLICATIONS

Japanese Patent Office, Office Action, Application No. 2019-516968, dated May 19, 2020, with English translation, 12 pages.

* cited by examiner

[Fig. 1]
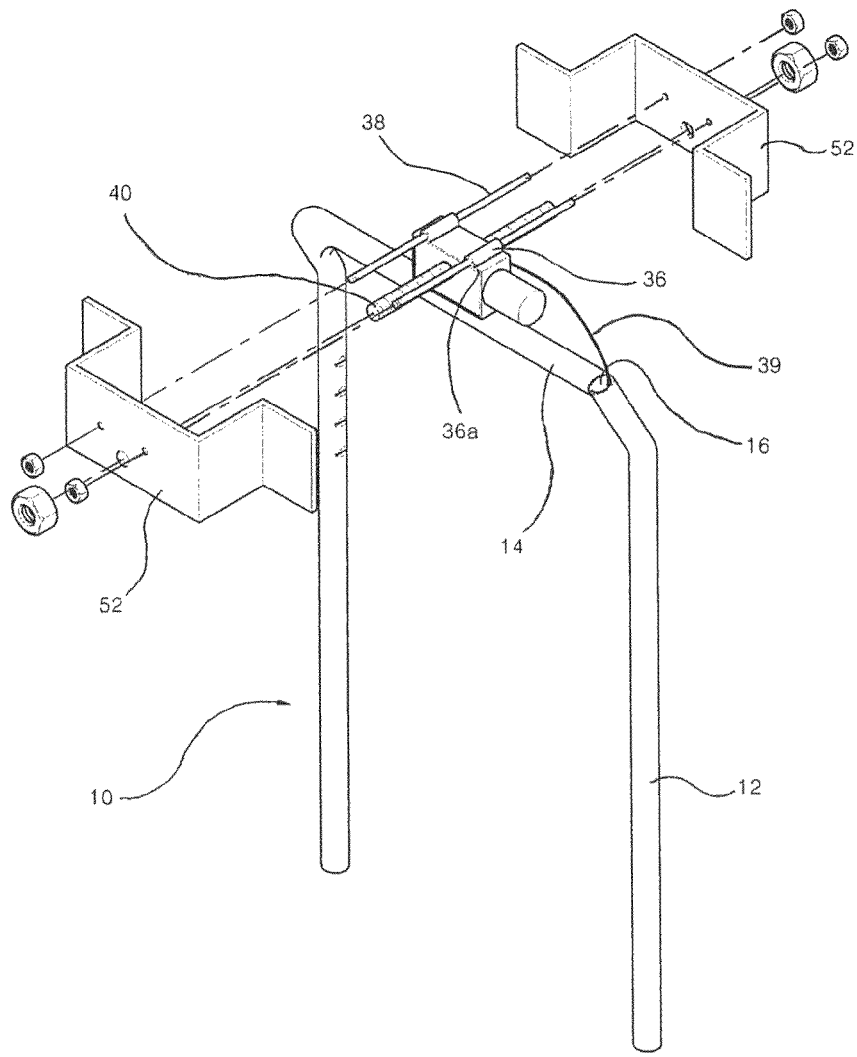

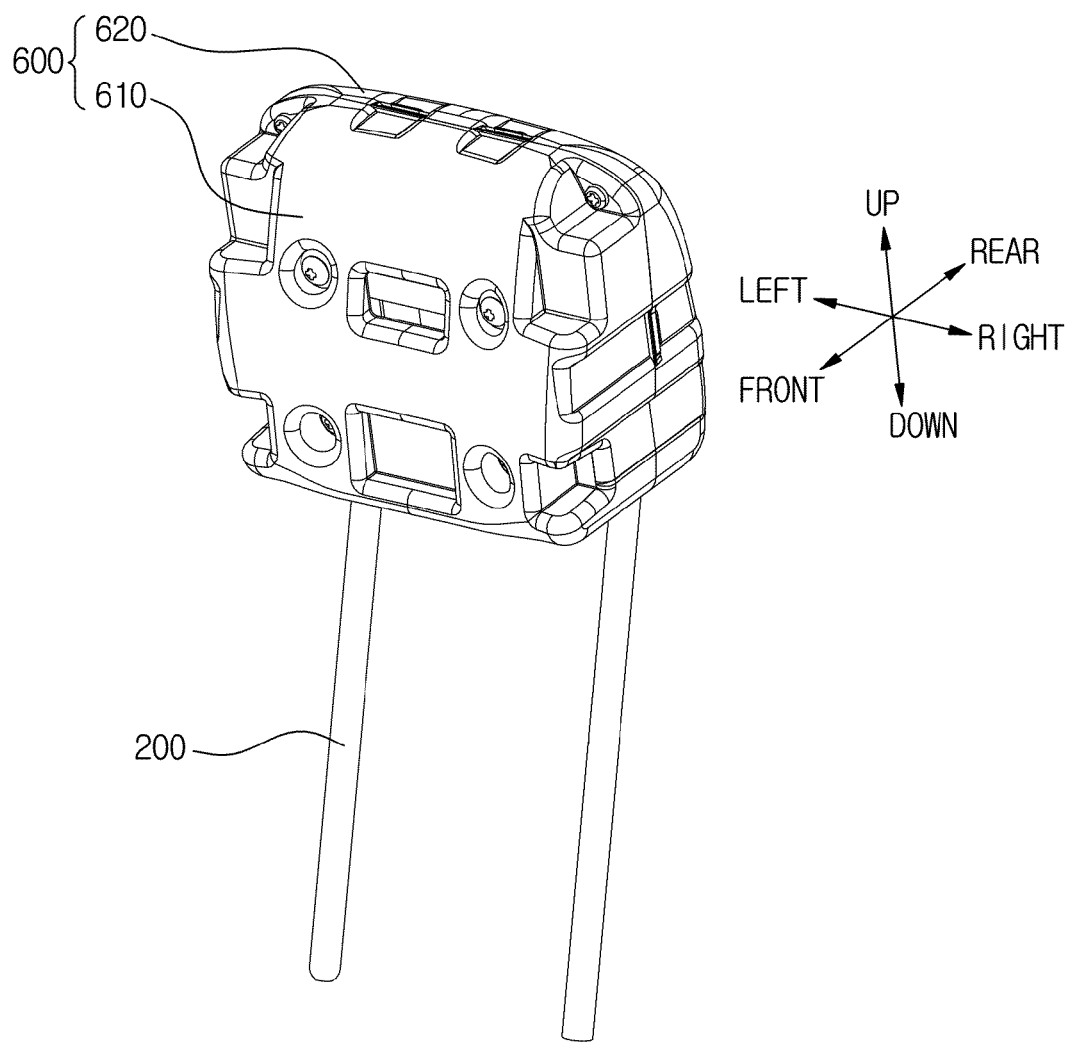
[Fig. 2]

[Fig. 3]
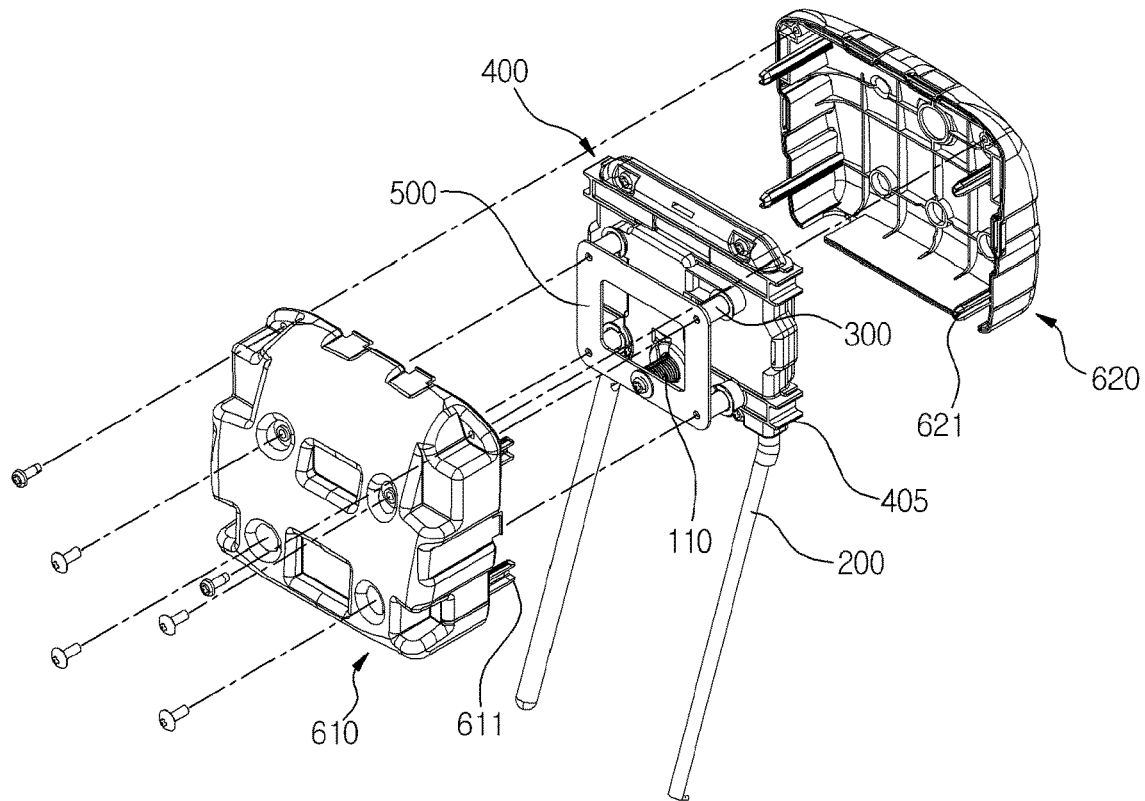
[Fig. 4]
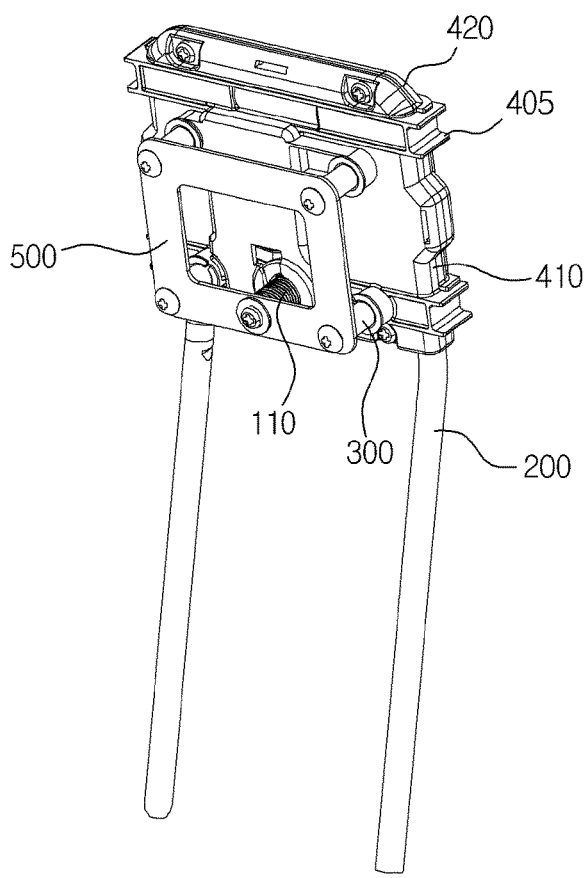

[Fig. 5]
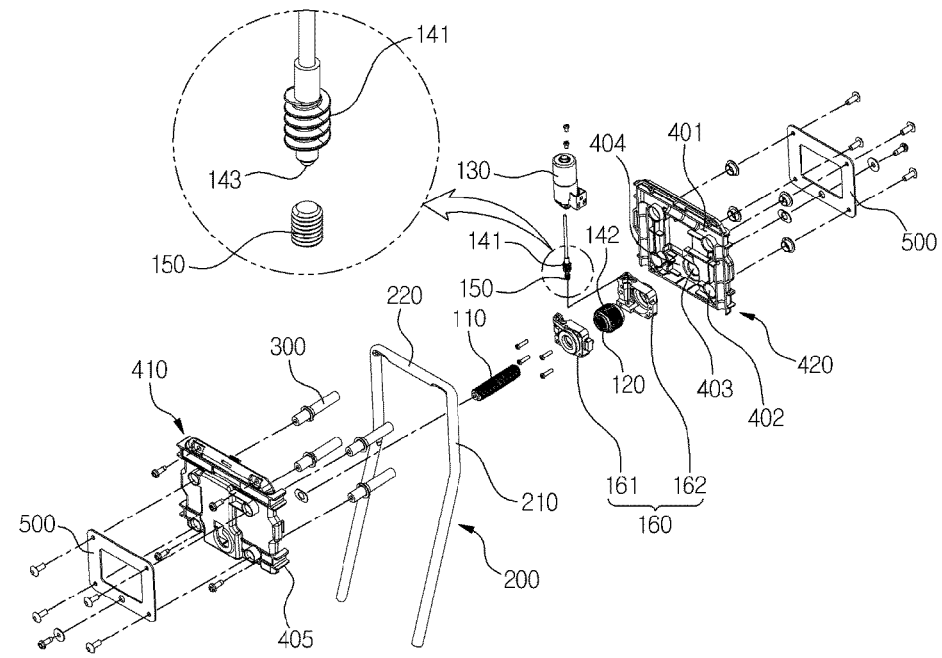
[Fig. 6]
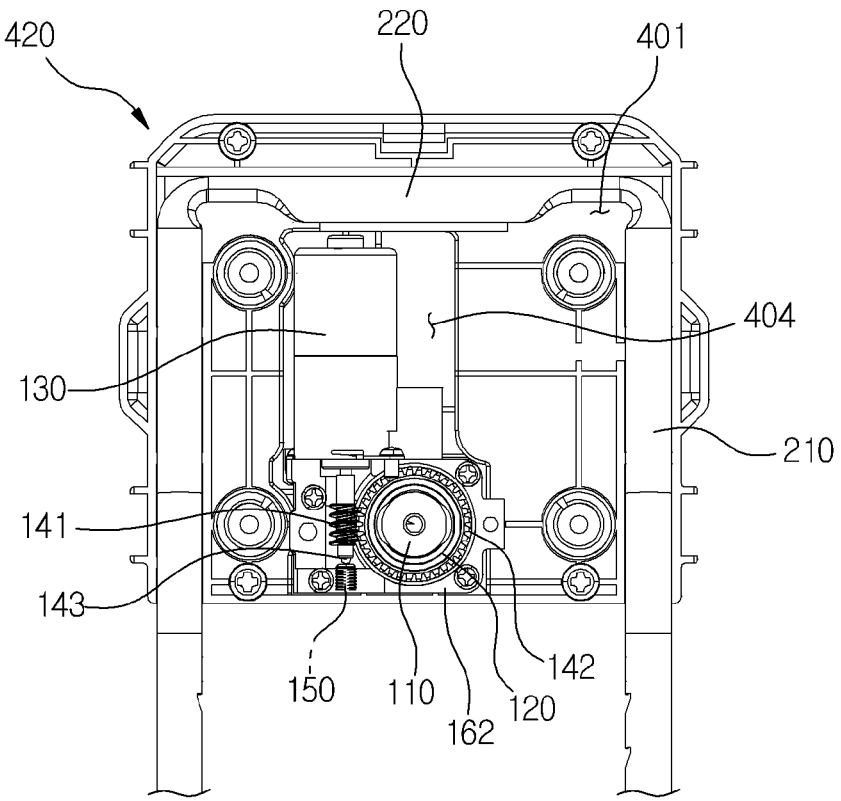

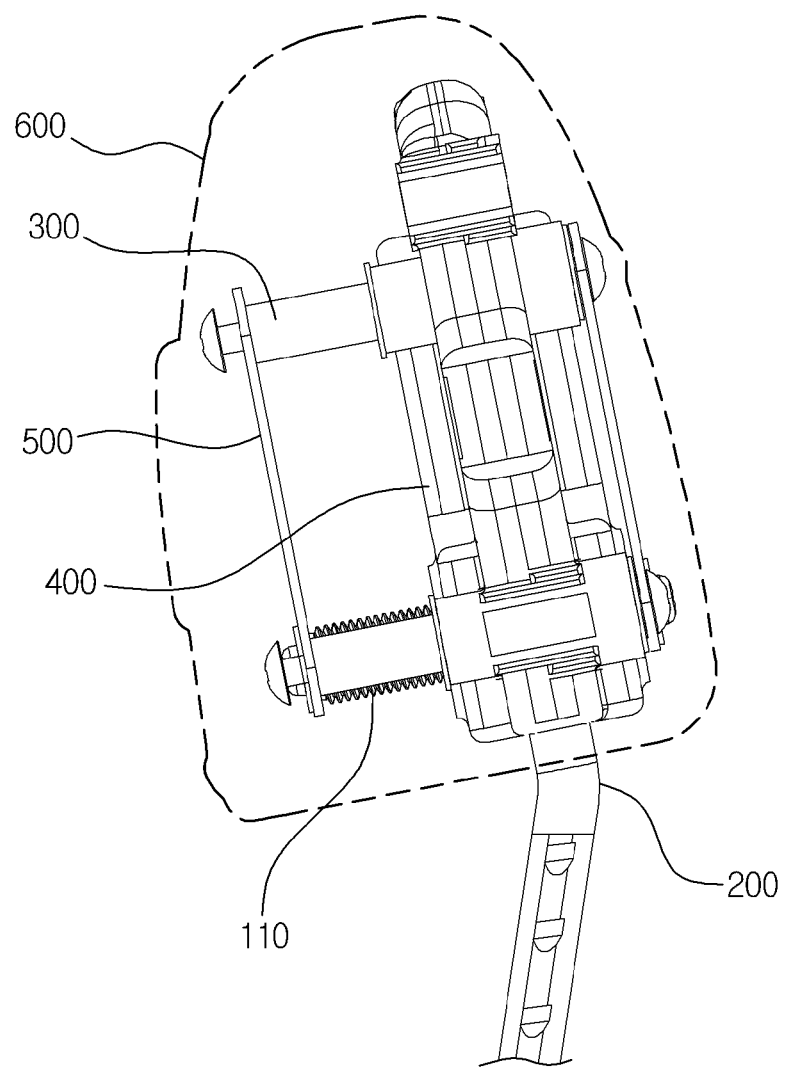
[Fig. 7]

[Fig. 8]
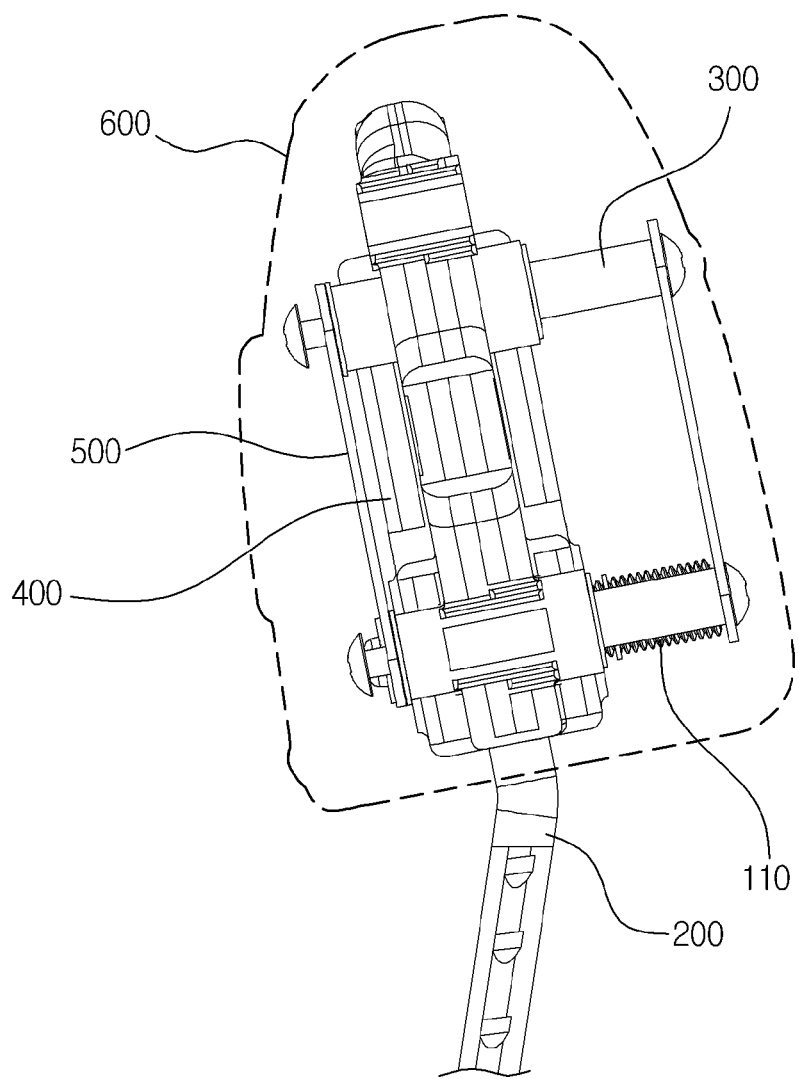

HEADREST MOVING DEVICE AND DRIVING UNIT OF HEADREST

TECHNICAL FIELD

The present invention relates to a headrest moving device, more particularly, relates to a headrest moving device provided with a contact assisting member for closely contacting two members engaged with each other for moving the headrest.

BACKGROUND ART

Generally, a headrest forward and backward device is a head holding device installed in the upper end portion of the car seat for preventing neck injury by supporting the back of the passenger's head in case of a rear collision, and it can be lifted and lowered to suit the height of the passenger's head.

As illustrated in FIG. 1, a headrest forward and backward device of the prior art has a configuration comprising: a stay 10 comprising a pair of vertical portions 12 and a horizontal portion 14, mounted in the upper side of a car seat; a reduction gear motor installed on the horizontal portion 14 of the stay 10 and comprising a distal gear formed with a thread in the center hole thereof; a pair of threaded rods 40 coupled to the center hole of the distal gear of the reduction gear and being advanced and retreated; a pair of moving plates 52 integrally coupled to the threaded rods 40; a housing of the assembly comprising the reduction gear, the threaded rods 40 and the moving plates 52, having an open lower portion so as to provide a space portion wherein the vertical portions 12 of the stay 10 are movable; and a head holding member made of foam material filled between the housing and a cover.

A pair of rod supporting parts 36 having through holes 36a on the upper surface of the reduction gear is provided so as to stably support the coupling state between the threaded rods 40 and the moving plates 52, and a pair of moving plate supporting rods 38, being advanced and retreated by passing through the through holes 36a of the rod supporting parts 36, with both end portions fixedly coupled to the moving plates 52 so as to be advanced and retreated integrally, is further provided.

The stay 10 is internally wired with a power cable 39 for supplying electricity to the reduction gear motor, more particularly, the power cable 39 is exposed to the outside of the tube body through an opening 16 formed at a location where the vertical portion 12 and the horizontal portion 14 meet.

However, the headrest forward and backward device of the prior art has a problem that a plurality of gears in the deceleration unit generate noises during forward rotation or reverse rotation. In addition, there is a problem in that power transmission is not smoothly performed during forward rotation or reverse rotation.

LEADING TECHNICAL LITERATURES

Patent Literature

[Patent Literature 1] Korea Registered Patent No. 699053

DISCLOSURE OF INVENTION

Technical Problem

An objective of the present invention devised for solving the above described problems is to provide a headrest moving device capable of smoothly transmitting power during forward rotation or reverse rotation and reducing noise during movement of a headrest.

Solution to Problem

To achieve above described objective, a headrest moving device of the present invention comprises: a screw; a nut part thread-coupled to the screw; a gear unit for rotating the nut part, comprising a first gear and a second gear engaged with the first gear; and a contact assisting member for closely contacting the first gear with the second gear.

The contact assisting member may be provided as a set screw.

A first housing wherein at least one of the first gear and the second gear is installed is further included, and the contact assisting member may be installed in the first housing so as to be in contact with the gear installed in the first housing.

A ball may be disposed between the contact assisting member and at least one of the first gear and the second gear.

The first gear is provided as a worm, and the second gear may be provided as a worm gear.

To achieve above described objective, a headrest driving device of the present invention comprises: a driving unit; a first gear rotated by the driving unit; a second gear engaged with the first gear; and a contact assisting member for closely contacting the second gear with the first gear.

To achieve above described objective, a headrest moving device of the present invention comprises: a screw; a nut part thread-coupled to the screw; and a contact assisting member for closely contacting the screw with the nut part.

Advantageous Effects of Invention

According to the headrest moving device of the present invention as described above, the following effects can be obtained.

Since a contact assisting member for closely contacting two members engaged with each other for moving the headrest is provided, the noise can be reduced during the movement on the headrest, and power can be smoothly transmitted during forward rotation or reverse rotation.

The contact assisting member is provided as a set screw, so that the frictional force between the members to be rubbed together due to the contact assisting member can be easily adjusted.

A first housing wherein at least one of the first gear and the second gear is installed is further included, and the contact assisting member is installed in the first housing so as to be in contact with a gear installed in the first housing, so that the driving device section including the gear can be modularized, thereby facilitating the assembling process and also facilitating the replacement and repair.

A ball is disposed between the contact assisting member and at least one of the first gear and the second gear so as to prevent occurring of friction between the gear and the contact assisting member, so that noise due to friction can be prevented.

The first gear is provided as a worm, and the second gear is provided as worm gear, so that the volume of the device can be minimized, the weight of the device can be reduced, and the reduction ratio can be reduced significantly.

BRIEF DESCRIPTION OF DRAWINGS

FIG. 1 is an exploded perspective view of a headrest forward and backward device of the prior art.

FIG. 2 is a perspective view of a headrest moving device according to a preferred exemplary embodiment of the present invention.

FIG. 3 is an exploded perspective view of a third cover of a headrest moving device according to a preferred exemplary embodiment of the present invention.

FIG. 4 is a perspective view of a headrest moving device according to a preferred exemplary embodiment of the present invention with the third cover removed.

FIG. 5 is an exploded perspective view of FIG. 4.

FIG. 6 is a front view illustrating the state of a headrest moving device according to a preferred exemplary embodiment of the present invention wherein the second cover and the front cover of the first cover are removed (the third cover is omitted).

FIGS. 7 and 8 are side views respectively showing the states wherein the headrest according to a preferred exemplary embodiment of the present invention is moved to the front direction and the rear direction.

MODE FOR THE INVENTION

Hereinafter, a preferred exemplary embodiment of the present invention will be described in detail with reference to the accompanying drawings as follows.

For reference, the components of the present invention which will be described hereinafter and are same as those of the prior art will not be described in detail separately, but instead, will be referred to the prior art described above.

When it is mentioned that one part is on the "top" of other part, this means that the part may be directly on the top of the other part or another different part may be associated with therebetween. In contrast, if it is mentioned that one part is "directly on the top" of the other part, no other part is interposed therebetween.

The terminology used is merely to refer to a particular embodiment and are not intended to limit the present invention. As used herein, the singular forms also include the plural form of text that does not indicate clearly the significance of the opposite. The meaning of "comprising" as used in the specification embodies a specific characteristic, region, integers, steps, operations, elements and/or components, however, it does not exclude the presence or addition of other specific characteristics, regions, integers, steps, operations, elements, components and/or groups.

"Lower," "down," "upper," "up," and the like are the terms representing a relative space, and they may be used to describe the relationship of one part with respect to the other part illustrated in the drawing easier. These terms are intended to include other meanings or operations of the device that is used with the meaning intended in the drawing. For example, if the device in the drawing is flipped, the part which was in the "lower" side of the other part is now in the "upper" side of the other part. Thus, the exemplary term "lower" includes all of the upper and lower directions. Device may be rotated 90°, or may be rotated at a different angle, and also the terms indicating the relative space are interpreted accordingly.

Hereinafter, the term "connection" includes both "direct connection" and "indirect connection."

As illustrated in FIGS. 2 to 8, a headrest moving device of the present exemplary embodiment is characterized in that and comprises: a screw 110; a nut part 120 thread-coupled to the screw 110; a gear unit for rotating the nut part 120, comprising a first gear 141 and a second gear 142 engaged with the first gear 141; and a contact assisting member 150 closely contacting the first gear 141 to the second gear 142, wherein a head rest is connected to any one of the screw 110 and the nut part 120, and a seat is connected to the remaining one.

The screw 110 is formed with threads on the outer circumferential surface, and the shaft of the screw 110 is disposed along the front-to-rear direction.

In the center portion of the nut part 120, a screw through-hole wherein the screw 110 is penetrating through is formed along the front-to-rear direction. Threads are formed on the inner circumferential surface of the nut part 120 and thread-coupled to the screw 110.

A head rest is connected to any one of the screw 110 and the nut part 120, and a seat is connected to the remaining one. In the present exemplary embodiment, a headrest is connected to the screw 110 and a seat is connected to the nut part 120. Unlike the above described description, a seat is connected to the screw and a headrest may be connected to the nut part.

The gear unit rotates the nut part 120, and comprises a first gear 141 and a second gear 142 engaged with the first gear 141.

The first gear 141 is provided as a worm, and the second gear 142 is provided as a worm gear.

The first gear 141 is connected to the shaft of a driving unit 130 and rotated by the driving unit 130.

The driving unit 130 is provided with a motor and the like.

The shaft of the driving unit 130 is disposed along the up-down direction. The shaft of the driving unit 130 is disposed in the lower side.

The shaft of the first gear 141 is disposed along the up-down direction, and the shaft of the second gear 142 is disposed along the front-to-rear direction.

The second gear 142 is connected to the nut part 120 and rotates the nut part 120.

A nut through-hole wherein the nut part 120 is inserted is formed in the second gear 142.

In addition, on the inner circumferential surface of the second gear 142, a protrusion that fits in a groove formed in the outer circumferential surface of the nut part 120 is formed. The groove and the protrusion are formed along the front-to-rear direction. That is, the nut part 120 is formed in the shape of a spline. Due to this, when the second gear 142 is rotated, the nut part 120 is also rotated simultaneously. Unlike this, threads are formed in the inner circumferential surface and gear teeth are formed in the outer circumferential surface so that the second gear and the nut part may be integrally formed.

Further, a first housing 160 wherein at least one of the first gear 141 and the second gear 142 is installed is further included.

In the present exemplary embodiment, the driving unit 130 and a headrest driving device including the first gear 141 and the second gear 142 is installed in the first housing 160.

The first housing 160 comprises a first front housing 161, a first rear housing 162 detachably installed in the rear side of the first front housing 161. The first front housing 161 and the first rear housing 162 are detachably coupled through bolts or the like.

The driving unit 130 is detachably installed in the upper side of the first housing 160 through bolts or the like. That is, the driving unit 130 is installed in the outer side of the first housing 160 so as to be exposed to the outside of the first housing 160.

Inside of the first housing 160, a first and a second gear receiving slots wherein the first and the second gears 141 and 142 are stably received are formed respectively. In addition, in the first housing 160, a hole wherein the screw 110 is penetrating through is formed so as to be communicating with the second gear receiving slot.

In addition, bush and washer are disposed in the inner wall of the first housing 160 and between the nut part 120 and the second gear 142 so that the nut part 120 and the second gear 142 can be rotated smoothly with respect to the first housing 160.

The contact assisting member 150 brings the first gear 141 into close contact with the second gear 142. The contact assisting member 150 pushes the first gear 141 upward to bring the first gear 141 into close contact with the second gear 142.

The contact assisting member 150 is provided as a set screw. The contact assisting member 150 may be provided with a screw having a hexagonal hole, and the end is formed flat. The end of the contact assisting member 150 may be formed of a soft material such as urethane or copper.

The contact assisting member 150 is installed in the first housing 160 so as to contact the shaft of the first gear 141 installed in the first housing 160.

In the first housing 160, a contact assisting member through-hole wherein the contact assisting member 150 is installed is penetratingly formed along the up-down direction. Therefore, the head portion of the contact assisting member 150 is exposed to the outside of the first housing 160, so that the contact assisting member 150 can easily adjust the frictional force.

The contact assisting member through-hole is formed so as to be communicating with the first gear receiving slot.

The contact assisting member through-hole is formed in the left lower portion of the first rear housing 162.

A thread is formed in the contact assisting member through-hole so that the contact assisting member 150 is screw-coupled to the first housing 160.

Therefore, the frictional force between the first gear 141 and the second gear 142 can be adjusted by rotating the contact assisting member 150.

Therefore, generation of noise can be prevented, and power transmission can be smoothly performed.

The contact assisting member 150 is disposed along the shaft direction of the first gear 141, and disposed at the lower side of the first gear 141.

Thus, the first gear 141 is disposed at the upper side of the contact assisting member 150; the driving unit 130 is disposed at the upper side of the first gear 141; the second gear 142 is disposed at the right side of the first gear 141; the nut part 120 is disposed inside the second gear 142; and the screw 110 is disposed inside the nut part 120.

A ball 143 is disposed between the contact assisting member 150 and the first gear 141 to which the contact assisting member 150 is contacted. The ball 143 is rotatably installed on the shaft of the first gear 141. Thus, the first gear 141 possibly rotates with respect to the contact assisting member 150. Friction between the contact assisting member 150 and the first gear 141 can be prevented from occurring due to such a ball 143.

The first housing 160 is installed inside a second housing 400.

The second housing 400 comprises a second front housing 410 and a second rear housing 420 detachably installed in the rear side of the first front housing 410. The second front housing 410 and the second rear housing 420 can be pre-assembled since hooks and hook coupling portions are formed in the upper middle portion and in the middle of the both sides, respectively.

In addition, a plurality of first protruded parts 405 which is rearwardly protruded is formed at the both sides of the upper and lower sides of the second front housing 410. The first protruded parts 405 are respectively disposed at the upper and lower sides of the hooks disposed in the middle of the both sides. In the second rear housing 420, a plurality of first inserting slots wherein the first protruded parts 405 are inserted is formed along the front-to-rear direction. In the outer sides of the first protruded parts 405, a plurality of second inserting slots is formed along the front-to-rear direction. Pre-assembling can be more facilitated due to such first protruded parts 405.

In addition, after the second front housing 410 and the second rear housing 420 are pre-assembled, the both sides of the upper and lower portions are assembled through bolt-coupling.

A stay rod receiving slot 401 wherein the vertical rods 210 and the horizontal rod 220 of the stay rod 200 are stably received is formed inside the second housing 400. Thus, the second housing 400, the first housing 160, the driving unit 130, the first gear 141, the second gear 142 and the nut part 120 are fixed along the up-down and left-to-right directions with respect to the stay rod 200.

The second housing 400 is also formed so as to surround the portion (bended portion) where the vertical rods 210 and the horizontal rod 220 are connected.

The vertical rods 210 and the horizontal rod 220 are stably received in the stay rod receiving slot 401 and then the second housing 400 is installed in the stay rod 200, so the installation load is not concentrated on a specific point, thereby improving the durability. Besides, the assembling process becomes facilitated and the existing stay rod can be used as it is without being modified.

In addition, a driving unit receiving slot 404 wherein the driving unit 130 and the first housing 160 is stably received is formed inside the second housing 400.

The driving unit receiving slot 404 is disposed in a way that the upper sides and both sides thereof are surrounded by the stay rod receiving slot 401.

Further, four of guide pin through-holes 402 are formed in the second housing 400 along the front-to-rear direction. The guide pin through-holes 402 are respectively formed in the both sides of the upper and lower portions. Guide pins 300 disposed along the front-to-rear direction are respectively inserted into the guide pin through holes 402.

Bushes are inserted into the front and rear sides of the guide pins 300, and thus bushes are disposed between the guide pins 300 and the second housing 400.

The guide pin through-holes 402 are disposed inside the stay rod receiving slot 401. The driving unit receiving slot 404 is disposed further inside than the guide pin through-holes 402. Thus, the guide pins 300, the driving unit 130 and the first housing 160 are surrounded by the horizontal rod 220 and the vertical rods 210 of the stay rod 200. Therefore, even when an impact is applied from the outside, the driving device is protected by the stay rod 200, thereby further enhancing the durability.

A screw through-hole 403 wherein the screw 110 is penetrating through is formed along the front-to-rear direction in the second housing 400.

The screw through-hole 403 is disposed between the guide pin through-holes 402 formed in the both sides of the lower portion.

Brackets 500 are detachably installed, through bolts or the like, respectively in the front and rear ends of the guide pins 300 protruded towards the outside of the second housing.

The front and rear ends of the screw 110 are detachably installed, through bolts or the like, respectively in the brackets 500 disposed at the front and rear sides.

The brackets 500 are formed in the shape of a rectangular frame wherein a through-hole is formed in the center portion thereof along the front-to-rear direction.

Guide pins 300 are installed in each of the corner areas of the bracket 500 so that the movement of the headrest along the front-to-rear direction may be performed more smoothly.

The bracket 500 disposed in the front side is installed in a third housing 600.

The third housing 600 comprises a third front housing 610 and a third rear housing 620 detachably installed in the rear side of the third front housing 610.

The bracket 500 and the second housing 400 are disposed inside the third housing 600.

A bracket receiving slot, wherein the bracket 500 disposed in the front side is stably received, is formed inside the third front housing 610.

Bolt coupling holes are formed in the third front housing 610 so as to be coupled to the bracket 500 through bolts. The bolt coupling holes are formed so as to correspond to the locations of the guide pins 300. Accordingly, the third front housing 610, the bracket 500 and the guide pins 300 are coupled using one bolt.

The third front housing 610 and the third rear housing 620 can be pre-assembled since hooks and hook coupling portions are respectively formed in the both sides of the upper portion, the middle of the both sides, and both sides of the lower portion.

In addition, a plurality of second protruded parts 611 rearwardly protruded is formed at the both sides of the upper and lower portions of the third front housing 610. The second protruded parts 611 are disposed at the upper and lower sides of the hook disposed at the middle of the both sides. The second protruded parts 611 are respectively inserted into the second inserting slots of the first protruded parts 405. A plurality of third inserting slots is formed in the second protruded parts 611 along the front-to-rear direction.

A plurality of third protruded parts 621 are forwardly and protrudedly formed at the both sides of the upper and lower portions of the third rear housing 620. The protruded parts 621 are inserted into the third inserting slots.

After the third front housing 610 and the third rear housing 620 are pre-assembled, the both sides of the upper and lower portions are assembled through bolt-coupling.

At the lower side of the third housing 600, a pair of withdrawing holes through which the vertical rods 210 of the stay rod 200 are withdrawn is formed long in length along the front-to-rear direction.

The outer side of the third housing 600 is covered by a shock absorbing member such as a sponge and a trim so as to form a headrest.

Meanwhile, a cut-out portion is formed in a region where the horizontal rod 220 and the vertical rod 210 meet so that the electrical wires connected to the driving unit 130 can be guided towards the seat through the stay rod 200.

Hereinafter, the operation of the present exemplary embodiment having the above described configuration will be described.

When the driving unit 130 is activated after receiving an input from various sensors or buttons or the control unit, the first gear 141 is rotated. The second gear 142 being interlocked with the first gear 141 is also rotated. As the second gear 142 rotates, the nut part 120 also rotates. The screw 110 thread-coupled to the nut part 120 is moved forward or backward with respect to the nut part 120.

That is, the screw 110, the brackets 500, the third housing 600 and the headrest are moved along the front-to-rear direction with respect to the nut part 120, the first housing 160, the stay rod 200 and the seat and the second housing 400.

Thus, the headrest is moved along the front-to-rear direction with respect to the seat.

Unlike the previous description, the contact assisting member pushes the screw or the nut part so that the screw and the nut part are in close contact with each other.

As described above, although the present invention has been described with reference to the preferred exemplary embodiments, various changes and alterations of the present invention can be made by those skilled in the art without departing from the spirit and the scope of the present invention written in the claims described herein below.

DESCRIPTION OF SYMBOLS

Description of numerals for major elements in drawings

110: screw, 120: nut part
130: driving unit, 141: first gear
142: second gear, 150: contact assisting member
160: first housing, 161: first front housing
162: first rear housing, 200: stay rod
210: vertical rod, 220: horizontal rod
300: guide pin, 400: second housing
401: stay rod receiving slot, 402: guide pin through-hole
403: screw through-hole, 404: driving unit receiving slot
405: first protruded part
410: second front housing, 420: second rear housing
500: bracket, 600: third housing
610: third front housing, 620: third rear housing
611: second protruded part, 621: third protruded part

The invention claimed is:

1. A headrest moving device comprising:
a second housing;
a driving unit, mounted on the second housing;
a first gear, mounted on the second housing and arranged for rotation by the driving unit;
a second gear, mounted on the second housing and being engaged with the first gear;
a nut part, mounted on the second housing and coupled to the second gear;
a screw, mounted on the second housing, passing through the second housing, and thread-coupled to the nut part;
a guide pin, movably coupled to the second housing and passing through the second housing;
a front bracket, positioned in front of the second housing and coupled to a front end portions of the screw and the guide pin;
a rear bracket, positioned in rear of the second housing and coupled to a rear end portions of the screw and the guide pin,
wherein the front and rear brackets move with respect to the second housing when the driving unit rotates the first gear.

2. The headrest moving device according to claim 1, wherein the first gear is provided as a worm, and the second gear is provided as a worm gear.

3. The headrest moving device according to claim 1, further comprising a contact assisting member for closely contacting the first gear with the second gear, wherein the contact assisting member is mounted on the second housing.

4. The headrest moving device according to claim 3, wherein a ball is disposed between the contact assisting member and at least one of the first gear and the second gear.

5. The headrest moving device according to claim 3, further comprising a first housing mounted on the second housing, wherein the first gear, the second gear, the nut part, and the screw are mounted on the first housing.

6. The headrest moving device according to claim 1, wherein a head rest is connected to the screw, and wherein a seat is connected to the nut part.

7. The headrest moving device according to claim 1, wherein the guide pin is provided in plurality.

8. The headrest moving device according to claim 1, wherein the nut part is disposed inside the second gear.

9. The headrest moving device according to claim 1, wherein the screw is disposed inside the nut part.

* * * * *